United States Patent [19]
Dingman, Jr. et al.

[11] Patent Number: 6,071,484
[45] Date of Patent: *Jun. 6, 2000

[54] PROCESS FOR TREATING GAS WITH ULTRA-LEAN AMINE

[75] Inventors: John Charles Dingman, Jr., Houston; Arthur Lee Cummings, League City, both of Tex.

[73] Assignee: MPR Services, Inc., Charlotte, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/788,932

[22] Filed: Jan. 24, 1997

[51] Int. Cl.$^7$ .................................................. C01B 17/15
[52] U.S. Cl. ........................ 423/229; 423/226; 423/228; 210/669
[58] Field of Search .................... 423/226, 228, 423/229; 210/669; 55/73

[56] References Cited

U.S. PATENT DOCUMENTS

| | | | |
|---|---|---|---|
| 2,688,000 | 8/1954 | Kressman et al. | 210/24 |
| 2,797,188 | 6/1957 | Taylor et al. | 196/32 |
| 2,812,312 | 11/1957 | Wilkinson | 260/2.1 |
| 3,984,314 | 10/1976 | Fries | 210/30 R |
| 4,122,149 | 10/1978 | Dunnery et al. | 423/242 |
| 4,170,628 | 10/1979 | Kosseim et al. | 423/243 |
| 4,267,159 | 5/1981 | Crits | 423/371 |
| 4,477,419 | 10/1984 | Pearce et al. | 423/228 |
| 4,795,565 | 1/1989 | Yan | 210/669 |
| 4,959,177 | 9/1990 | Schutt | 252/391 |
| 4,970,344 | 11/1990 | Keller | 423/228 |
| 4,999,113 | 3/1991 | Weber | 210/664 |
| 5,006,258 | 4/1991 | Veatch et al. | 210/667 |
| 5,045,291 | 9/1991 | Keller | 423/228 |
| 5,137,550 | 8/1992 | Hegarty et al. | 55/43 |
| 5,145,658 | 9/1992 | Chao | 423/232 |
| 5,162,084 | 11/1992 | Cummings et al. | 210/662 |
| 5,277,822 | 1/1994 | Higgins | 210/673 |
| 5,450,892 | 9/1995 | Gautreaux, Jr. | 162/16 |
| 5,556,606 | 9/1996 | Khanmamedov | 423/228 |
| 5,603,908 | 2/1997 | Yoshida et al. | 423/220 |
| 5,607,594 | 3/1997 | Pohl et al. | 210/662 |

FOREIGN PATENT DOCUMENTS

| | | | |
|---|---|---|---|
| 2386490 | 11/1978 | France | C02C 5/08 |
| 4426 901 A1 | 2/1997 | Germany | C02F 1/46 |

*Primary Examiner*—Tom Dunn
*Attorney, Agent, or Firm*—Alston & Bird LLP

[57] ABSTRACT

There is provided a process for treating a process gas or liquid to remove acid gases which includes treating a relatively lean amine gas scrubbing solution to further reduce the acid gas content of at least a portion of that lean amine gas scrubbing solution such that it becomes an ultra-lean amine solution (one substantially free of acid gas) and the beneficial use of the ultra-lean amine solution to obtain further reductions in the acid gas contents of specific gas or liquid process streams not possible with lean amine solutions having higher residual acid gas loadings. In another aspect of this invention there is provided a process for producing the ultra-lean amine.

21 Claims, 6 Drawing Sheets

PROCESS FOR TREATING GAS WITH ULTRA-LEAN AMINE

BACKGROUND OF THE INVENTION

The present invention relates to an improved process for the removal of acid gases, such as $H_2S$ and $CO_2$ from process gas and liquid streams by contact with amine solutions. More particularly, use of the present invention significantly reduces the amount of residual acid gas in the absorber overhead product stream. In addition, the process has the potential to significantly reduce the amount of extra stripper reboiler heat duty often needed to obtain adequate regeneration of the amine solution to enable an absorber to reduce the acid gas contents of a product stream to desired levels.

Acid gases (e.g., $H_2S$ and $CO_2$) are removed from process gas and liquid streams by contacting with an amine solution, typically aqueous alkanolamine solutions. Current product and regulatory requirements mandate reductions of the acid gas content of the product, particularly the sulfur contents. The expected trend is for continued reduction of sulfur content mandated by regulatory agencies. Such reductions can strain or exceed the design and operation capability of many amine treating systems. Also, increased production demands and/or processing of higher sulfur crudes by oil refineries or more sour natural gas can similarly strain the capacity of an amine system. Improvement in the removal of acid gas ($H_2S$ primarily), may become critical to the ability of many plants to stay in compliance with federal and state regulatory limits on maximum sulfur contents of fuel gas and overall plant sulfur emissions.

For example, failure of a tail gas treating unit (TGTU) to reduce the sulfur content of the TGTU absorber off-gas to levels required to keep the stack gas sulfur content below maximum levels mandated by state and federal air quality regulations can result in having to shut down a plant until the sulfur content of the TGTU absorber off gas can again be reduced to acceptable levels.

Current practice employs a recycle process involving the counter-current contact and absorption of the acid gas by amine in a column, followed by thermal regeneration of the amine by counter-current flow of rich amine fed to the top of a stripping column and steam generated by reboiling the amine solution at the base of the stripping column, to reduce the acid gas content of the amine, followed by cooling and return to the absorber. Acid gases containing $H_2S$ which are released in the stripping column are usually disposed of by incineration of small quantities or by conversion of larger quantities to elemental sulfur or sulfuric acid.

In the processing of gas and liquid streams, acid gas (e.g., $H_2S$ and $CO_2$) impurities are removed by contact with an amine solution. Amine solutions are used because of their relatively high absorption capacity of acid gases, and the relative ease with which acid gases can be stripped from the amine solutions by heat, typically at pressures of 25–35 psia. The regenerated amine solution is then cooled and recycled to the contactor again to absorb more acid gas. Thus, an amine solution is circulated around and around through the system, which typically consists of a contactor (or absorber), a stripper (or regenerator), and pumps, reboiler, coolers, heat exchangers, etc. An amine solution that contains large quantities of absorbed acid gas is called rich amine. When stripped of acid gas, it is called lean amine. The residual acid gas remaining in the lean amine solution is commonly called lean loading. Generally, the contactor is a counter-current flow tower wherein the lean amine is fed to the top of the contactor and flows from top down while the sour process gas or liquid stream is fed to the bottom of the contactor and flows from bottom to top. The stripper is also a counter-current flow tower, wherein amine flows from top to bottom and steam and acid gas vapors flow out the top. The primary purpose of the system is to reduce the acid gas content of a process stream to a specified level. The operation of the amine system is therefore driven by the need for acid gas removal in the contactor.

The use of counter-current flow design for the contactor intends that the leanest amine (amine that has the least acid gas content) contact the leanest process stream, to maximize the amount of acid gas removed from the process stream leaving the contactor. The degree to which this is realized depends on equipment, solvent type, process design, and process operating conditions. This includes hardware design for columns (including the selection of internal mass transfer devices) and operating conditions of temperature, pressure, flow rates, and acid gas loadings of both the lean and rich amine solutions.

The residual acid gas loadings of both $H_2S$ and $CO_2$ in the regenerated (lean) amine solutions are probably the major limiting factors affecting the ability of the amine system to take the acid gas content of the treated process stream to lower levels. For example, the partial pressures of the acid gases in the treated gas leaving the contactor cannot be reduced to levels below the acid gas partial pressures existing over the lean amine solution due to the residual acid gas loading. Therefore any significant reduction in residual acid gas loading of the lean amine will improve the degree of acid gas removal from the process stream leaving the contactor.

When the acid gas partial pressures exerted by the lean amine entering the contactor are too high to provide the required level of acid gas removal from the process stream, the amine stripper operation becomes the focus of attention. Improvement of the amine stripping operation to reduce the acid gas loading of the lean amine solution, will result in a lowering of the acid gas partial pressure over the lean amine entering the contactor. For example, either additional stripper reboiler heat duty to increase the amount of internal stripping steam generated or, where permissible, a reduction of the amine flow to the stripper, with the same reboiler duty, will result in better regeneration of the lean amine. The former increases immediate operating costs resulting from the increased heat duty (steam) provided while maintaining solution circulation rate and gross acid gas pickup capacity. The latter option of decreasing the flow of rich amine to the stripper will result in a lowering of sensible heat requirements, which in turn results in an increase of heat available to produce more internal stripping steam. This reduction in amine circulation rate however will result in higher acid gas loading of the rich amine from the contactor. If the partial pressures of the acid gases in the sour contactor feed stream are limiting in regard to the amount of acid gas the rich amine solution can absorb, the overhead process stream from the contactor will go sour (retain too much acid gas) regardless of how well the lean amine has been regenerated.

The prior art for obtaining a more complete regeneration of acid gas from a lean amine gas treating solution has typically involved increasing the stripper reboiler heat duty to increase the amount of steam stripping in the lower portion of the amine regenerators, or increasing the back-pressure of the amine regeneration process to increase the boiling point of the lean amine solution. The acid gases are not held by the amine as strongly at the higher temperature.

The use of higher temperature however, typically results in more thermal decomposition and degradation of the amine. Thus, there remains a need for a method capable of providing leaner amine treating solutions that can further reduce the residual acid gas content of process streams being treated.

SUMMARY OF THE INVENTION

It is therefore the general object of the present invention to provide an improved process for a further reduction of acid gas of a lean amine stream to produce an ultra-lean amine that is carried out without major modification of existing amine regeneration systems.

Another object of the present invention is to provide improvements to existing acid gas scrubbing processes that make beneficial use of the ultra-lean amine solution to reduce acid gas content of process gases or liquids, with minimal hardware modifications and without higher energy requirements or increased severity of the stripper operation.

It has been found that the process for treating a process gas or liquid to remove acid gases according to this invention results in significant improvement in the removal of the acid gases from the product gas or liquid. This process is based on the availability of a more thoroughly regenerated lean amine solution, hereafter referred to as "ultra-lean amine," and some of the process flow modifications recommended to take maximum advantage of any quantity of ultra-lean amine solution available. This ultra-lean amine solution may be used either in addition to or in place of lean amine solutions obtained by normally utilized regeneration processes.

One configuration of this process includes first contacting the sour gas stream with a lean amine gas treating solution to absorb the majority of the acid gases. In this first step most of the acid gases are absorbed. Thereafter, contacting the partially treated process gas or liquid stream with an ultra-lean amine treating solution to effect a substantial additional removal of the remaining acid gases. The "sweet" product gas or liquid is recovered with a substantial reduction in the concentration of acid gases relative to the first stage of contact.

The preferred process is to treat a portion of a lean amine gas treating solution to remove essentially all of the residual acid gas salts. These essentially completely regenerated lean amine (ultra-lean amine) solutions are used to produce an overall reduction of acid gas loading of the amine fed to an absorber and thereby reduce the residual acid gas content of the treated gas to lower levels than normally obtainable. This ultra-lean amine solution can also be segregated from the other lean amine solutions and used in the absorber to obtain lower levels of acid gas in the treated gas than normally obtainable. The preferred amines include, for example, monoethanolamine, diethanolamine, triethanolamine, and DIGLYCOLAMINE® (2-(2-aminoethoxy) ethanol), methyldiethanolamine, diisopropanolamine, methylmonoethanolamine, dimethylmonoethanolamine, aminomethylpropanol, and FLEXSORB® hindered amines. These and other amines may be used alone or in combinations in aqueous mixtures and as hybrid amine solvents combined with a physical solvent, such as sulfolane (tetrahydrothiophenedioxide), N-methyl-2-pyrrolidone, SELEXOL® (dimethylether of polyethylene glycol), and methanol. Other bases and solvents that can be used the same way as alkanolamines, that is, to absorb acid gases in a contactor and release them in a regenerator, may be used with the present invention.

BRIEF DESCRIPTION OF THE DRAWINGS

Other objects, features and advantages of the present invention will become apparent from the following detailed description taken in conjunction with the drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
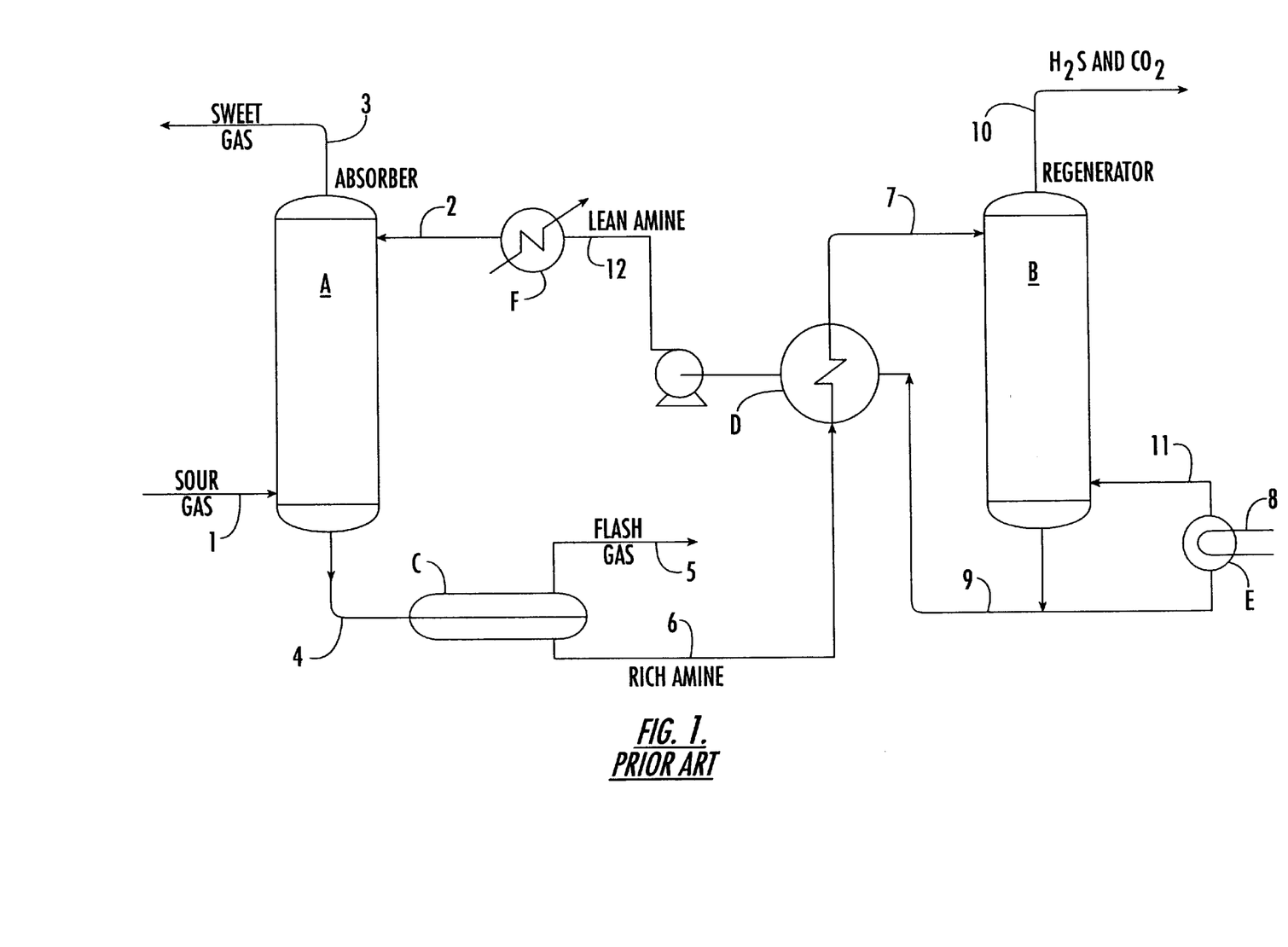
FIG. 1 is a schematic flow diagram which illustrates a process of the prior art.

Referring now to FIG. 1, there is shown a schematic diagram of an amine recycle process as currently used wherein a sour gas stream containing undesirable hydrogen sulfide and carbon dioxide is introduced to a countercurrent contact absorber A through line 1. The sour gas flows upward through absorber A and contacts downward flowing lean amine which is introduced to the top of the absorber through line 2. Typical sour gas inlet (line 1) temperatures may be from about 80° F. to about 110° F. Amine inlet temperatures in line 2 are typically 10° to 20° higher. Absorber inlet pressures can range from near atmosphere to about 2500 psig, depending upon the application. A product gas (sweet gas), having most of the hydrogen sulfide removed, exits through line 3. Residual concentration of $H_2S$ in oil refinery fuel gas streams is typically less than 160 ppmv and in natural gas streams is less than 4 ppmv.

An amine solution containing absorbed hydrogen sulfide and carbon dioxide as salts of amine is removed from the absorber through line 4 and for medium to high pressure absorber applications is sent to a rich amine flash tank C, which is used in the majority of installations to promote the flashing of dissolved and entrained product gases from the rich amine solution, where flash gases exit through line 5 and the rich amine solution exits through line 6 and passes through a lean/rich heat exchanger D to receive sensible heat from the hot lean amine solution before being introduced to amine regenerator stripping column B through line 7. Internal stripping steam is generated by reboiling the amine solution in stripper reboiler (heat exchanger E) with a suitable heat medium 8. The lean amine temperature will vary from about 220° F. to 280° F., depending on the amine, its concentration and pressure. The steam generated from the reboiled amine is introduced near the bottom of stripping column B through line 11 and passes upward through the amine solution providing heat to decompose the hydrogen sulfide and carbon dioxide amine salts and the vapor flow to sweep them away from the amine solution and out of the stripper column. A mixture of steam, hydrogen sulfide, and carbon dioxide is then removed overhead from the stripper through line 10. A lean amine stream 9 exits the bottom of the stripper, is passed through the lean/rich amine exchanger D and is pumped through a cooler F to the top of absorber A through line 2.

It has been found that if the lean amine stream is processed to further remove residual acid gas salts to form an ultra-lean amine solution and, as shown in FIGS. 2–6, is introduced to the top tray or top of a packed section in the absorber (contactor), a very significant improvement in the removal of residual acid gases from the product in stream 3 is obtained. While it would be unusual to utilize only ultra-lean amine for a treating application, there could be special situations that could justify this arrangement. Availability of an ultra-lean amine can be used to improve the treating capabilities in a number of different process variations. The most beneficial use of an ultra-lean amine solution would be to use it as a last stage of product stream contactor where acid gas contents are already low. This further improvement in acid gas removal can be achieved by lowering the main lean amine feed point to an absorber by 2 or more trays, or an equal amount of packing, replacing the trays or packing in the top of the absorber above the main lean amine feed point with trays having a positive liquid seal (such as bubble cap trays) to effect a longer residence time of the ultra-lean amine to prevent weeping of the ultra-lean amine and to minimize channeling of the gas. The extremely low $H_2S$ and $CO_2$ partial pressures over the ultra-lean amine will reduce the acid gas content of the treated gas to levels not obtainable with the lean amine regenerated in the conventional manner.

Figure 2:
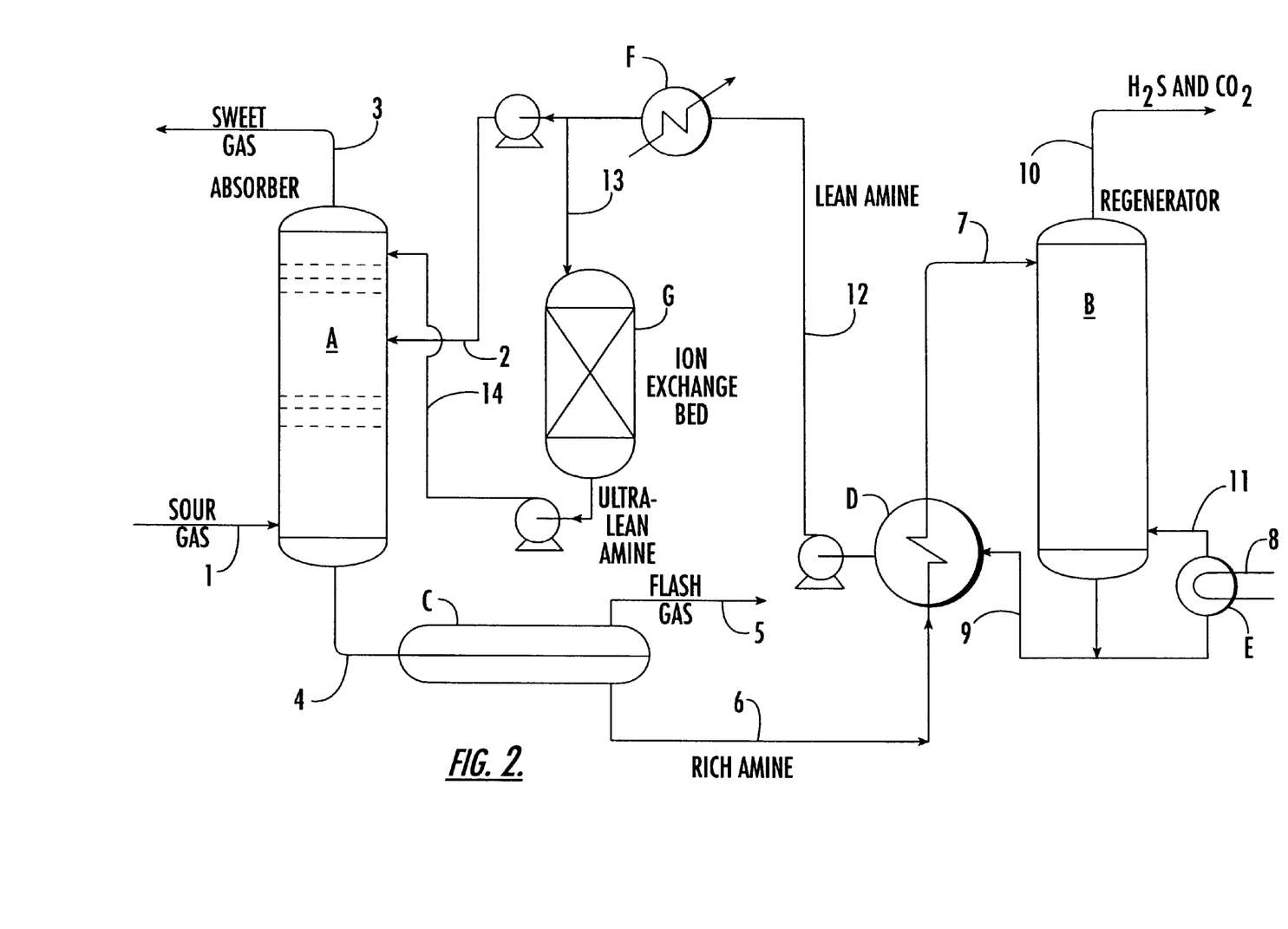
FIG. 2 is a schematic flow diagram which illustrates a preferred embodiment of the present invention.

In a preferred embodiment such as that shown in FIG. 2, there is provided an acid gas removal process wherein a sour gas stream containing undesirable hydrogen sulfide and carbon dioxide is introduced to a countercurrent contact absorber A through line 1. As the sour gas flows upward through absorber A the sour gas contacts downward flowing mixture of normal lean amine which is introduced to the absorber through line 2 at a point 2 or more trays below the top entry point of the absorber A and the ultra-lean amine solution from the contacting stages above line 2. The process gas has most of the acid gases removed by the time it leaves the first stage of contact with the lean amine from line 2. The ultra-lean amine stream is introduced to the top tray through line 14 and serves to greatly improve the removal of the remaining acid gases. A product gas (sweet gas) having a substantially reduced content of the hydrogen sulfide and carbon dioxide from that obtainable with only the normal lean amine is withdrawn from the top of the absorber via line 3.

A stream of rich amine solution containing absorbed hydrogen sulfide and carbon dioxide as salts of amine is removed from the absorber through line 4, the pressure is reduced and then goes to the rich amine flash tank C. The flash gases exit through line 5 and the rich amine solution exits through line 6. The rich amine stream passes through lean/rich heat exchanger D to recover sensible heat from the hot lean amine and is then introduced to amine regenerator stripping column B through line 7. Internal stripping steam is generated by reboiling the amine solution in stripper reboiler (heat exchanger E) with a suitable heat medium 8. The lean amine temperature will vary from about 220° F. to 280° F., depending on the amine, its concentration and pressure. The steam generated from the reboiled amine is introduced near the bottom of stripping column B through line 11 and passes upward through the amine solution providing heat to decompose the hydrogen sulfide and carbon dioxide amine salts and the stripping vapor to sweep the acid gas away from the amine solution and out of the stripping column. The mixture of steam, hydrogen sulfide, and carbon dioxide exits the stripper overhead through line 10.

A hot lean amine stream 9 exits the bottom of the stripper B, is passed through the lean/rich heat exchanger D and through a cooler F where the lean amine solution is cooled to a temperature of about 95° F. to 130° F. The cooled lean amine stream 12 is split and one lean amine portion continues through line 2 to the absorber A at a point 2 or more trays below the top amine entry point. The remaining portion passes through line 13 to converter G, where a lean amine is converted to ultra-lean amine. Converter G, which is shown in FIG. 2 as an ion exchange resin bed, removes essentially all the residual acid gases from this portion of the lean amine solution, producing an ultra-lean amine solution which is then pumped through line 14 to the top of absorber A.

Ultra-lean amine may be produced by treating a stream of regular lean amine using the following types of technology: ion exchange, reverse osmosis, semi-permeable membranes, surface adsorption, distillation, electrophoris or other processes capable of a substantial further removal of acid gas from the lean amine solution. Ion exchange is the preferred embodiment for ultra-lean amine production in the present invention, as shown in FIG. 2. The amine solution exiting the ion exchange resin typically can contain less than 0.0001 of total moles of total acid gas per mole of amine and may be reduced to even lower levels of residual $H_2S$ loadings.

The preferred amines include, for example, monoethanolamine (MEA), diethanolamine (DEA), triethanolamine (TEA), and DIGLYCOLAMINE® (DGA; (2-(2-aminoethoxy) ethanol) (a registered trademark of Huntsman Corporation), methyldiethanolamine (MDEA), diisopropanolamine (DIPA), methylmonoethanolamine (MMEA), dimethylmonoethanolamine (DMMEA), aminomethylpropanol (AMP), and FLEXSORB® hindered amines (FLEXSORB® is a registered trademark of Exxon Corporation). These and other amines may be used alone or in combinations in aqueous mixtures and as hybrid amine solvents comprised of a mixture of one or more of the amines with a physical solvent, such as sulfolane (tetrahydrothiophenedioxide), N-methyl-2-pyrrolidone (NMP), SELEXOL® (DMEPEG; dimethylether of polyethylene glycol) (a registered trademark of Union Carbide Corporation), other dialkylethers of polyalkylene glycol, and methanol. Other bases and solvents that can be used the same way as alkanolamines, that is, to absorb acid gases in a contactor and release them in a regenerator, may be used.

It should be understood that the amine regenerator (stripper B) may be sized to regenerate rich amines from one to as many as 20 or so absorbers. Thus, the lean amine stream 2 would be used in all absorbers while use of the ultra-lean amine stream 14 might be restricted for use only in absorbers in need of better $H_2S$ removal. It should also be understood that when applied to a split flow amine sweetening operation, line 2 would receive flow of semi-lean amine from an intermediate point along regenerator B and line 12 would receive lean amine from the bottom of regenerator B.

To realize the maximum benefit from the use of ultra-lean amine, the flow of regular lean amine should remove all but minor amounts of the acid gas contained in the process gas (or liquid) stream being treated prior to that stream contacting the ultra-lean amine being fed to the trays above the lean amine feed point. The much lower equilibrium partial pressures of hydrogen sulfide and carbon dioxide over the ultra-lean amine will enable (result in) a more complete removal of acid gases than would normally be possible. This is particularly beneficial for applications involving sour gas streams with high $H_2S/CO_2$ ratios and low treating pressures. Treating of refinery fuel gas streams and tail gas treating units processing sulfur plant off-gases are good examples of where lower than normal levels of $H_2S$ may be required to be able to meet specific end use or overall plant sulfur emission limitations mandated by various state and federal requirements. Low pressure treating of rich associated gases flashed off crude oil production in the field is another difficult treating application where ultra-lean amine would be desirable, since these streams are usually available to the plant at low pressures.

Figure 3:
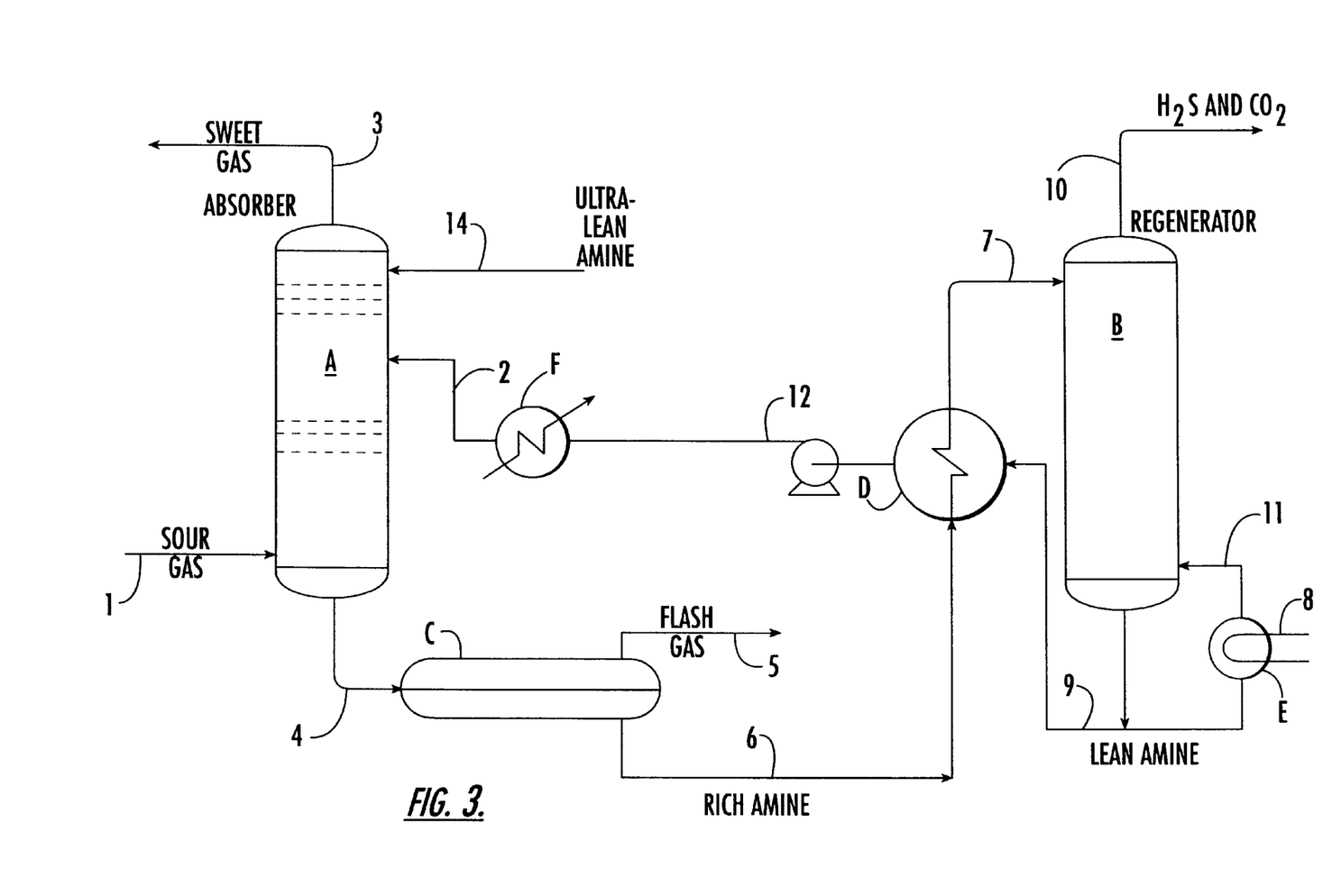
FIG. 3 is a simplified schematic flow diagram which illustrates lean amine feed 2 or more trays below ultra-lean amine feed to the top tray.

In another embodiment of the process of this invention, that shown in FIG. 3, there is provided a simplified typical schematic showing an ultra-lean amine feed 14 from any source directly to the top of the absorber A. A lean amine solution is introduced to the absorber at a lower point, such as 2 or more trays below the ultra-lean amine solution stream. Like the process of FIG. 2 a sour gas stream is introduced to a countercurrent contact absorber A through line 1. The sour gas flows upward through absorber A contacting a mixture of downward flowing normal lean amine introduced to the absorber through line 2 and the former ultra-lean amine flowing down from above the line 2 entry point, removing most of the acid gases. The ultra-lean amine stream is introduced at the top tray through line 14 and removes a substantial additional amount of the remaining acid gases. The product gas is withdrawn from the top of the absorber via line 3.

The stream of rich amine solution is removed from the absorber through line 4 and sent to an optional rich amine flash tank C, just as in the process described in FIG. 2. The flash gases exit through line 5 and the rich amine solution exits through line 6. The rich amine solution passes through lean/rich heat exchanger D and is introduced to stripping column B through line 7. Steam generated by reboiling the amine solution in heat exchanger E (stripper reboiler) is returned to the vapor space near the bottom of stripping column B through line 11 and passes upward through the amine solution converting acid gas amine salts to acid gases and strips them from the amine solution. A mixture of steam, hydrogen sulfide and/or carbon dioxide is then removed overhead from the stripper through line 10.

A lean amine stream 9 exits the bottom of the stripper B, passes through the lean/rich heat exchanger D and then via line 12 through a lean amine circulation pump, through a cooler F and continues through line 2 to the absorber A. A stream of ultra-lean amine from any source is introduced directly to the absorber A through line 14. This stream may also include fresh or unused (virgin) amine used to supplement or make up amine losses incurred during normal operation.

Figure 4:
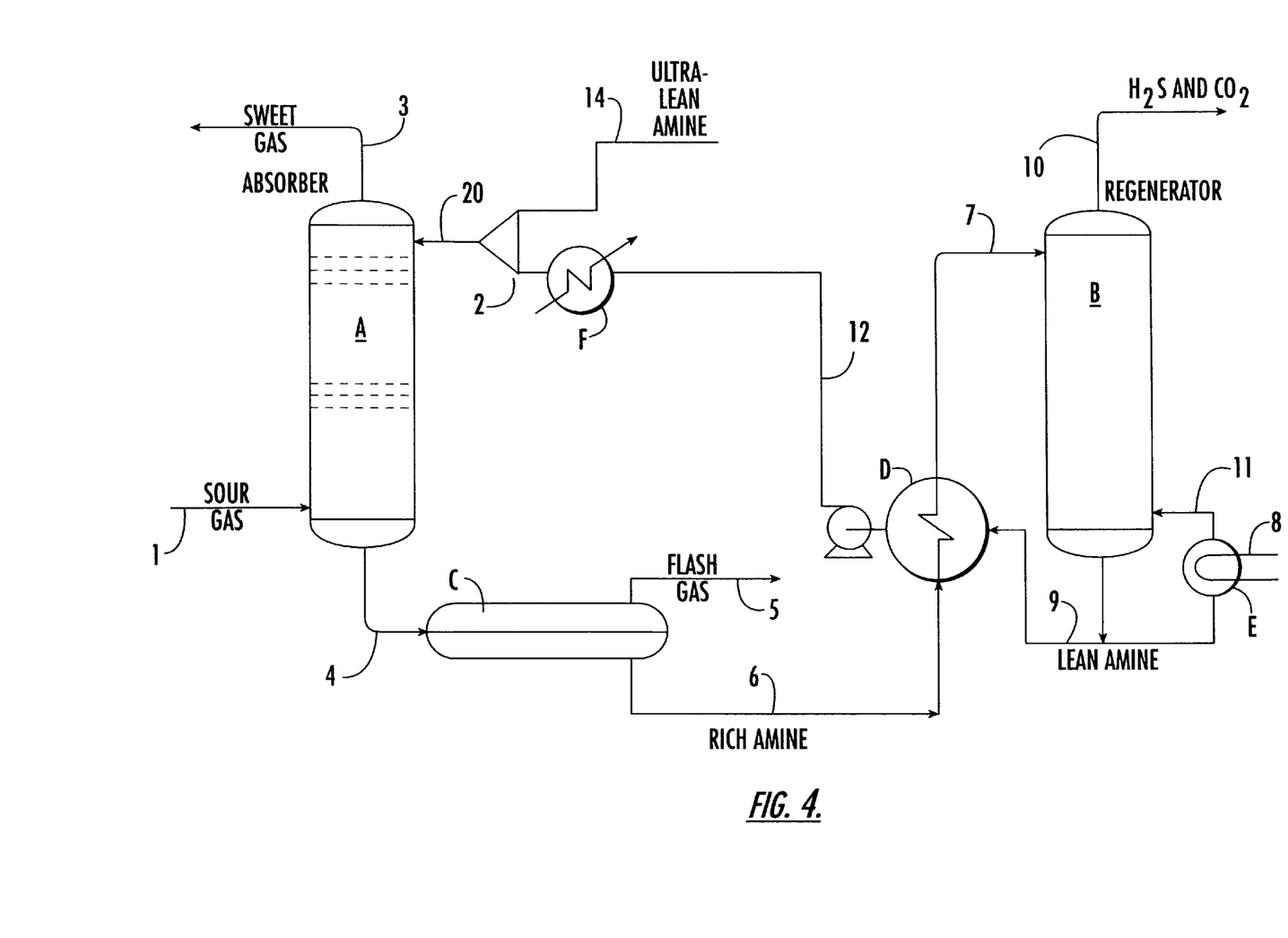
FIG. 4 is a schematic flow diagram which illustrates another embodiment of the present invention showing supplemental feed of ultra-lean amine to the lean amine to produce a mixture having lower acid gas loading than the lean amine.

In another embodiment of the invention, that shown in FIG. 4, the ultra-lean amine flow is mixed with the lean amine flow being fed to the regular lean amine feed nozzle to the absorber A. The reduction of the residual acid gas loading in the amine blend resulting from the dilution effect from the ultra-lean amine will improve the ability to treat the process stream to lower acid gas levels. The acid gas absorption in absorber A and the lean amine regeneration in stripper B are like those shown in FIGS. 2 and 3, except that the ultra-lean amine stream 14 is joined with the lean-amine stream 2 prior to being fed to the absorber through line 20.

Figure 5:
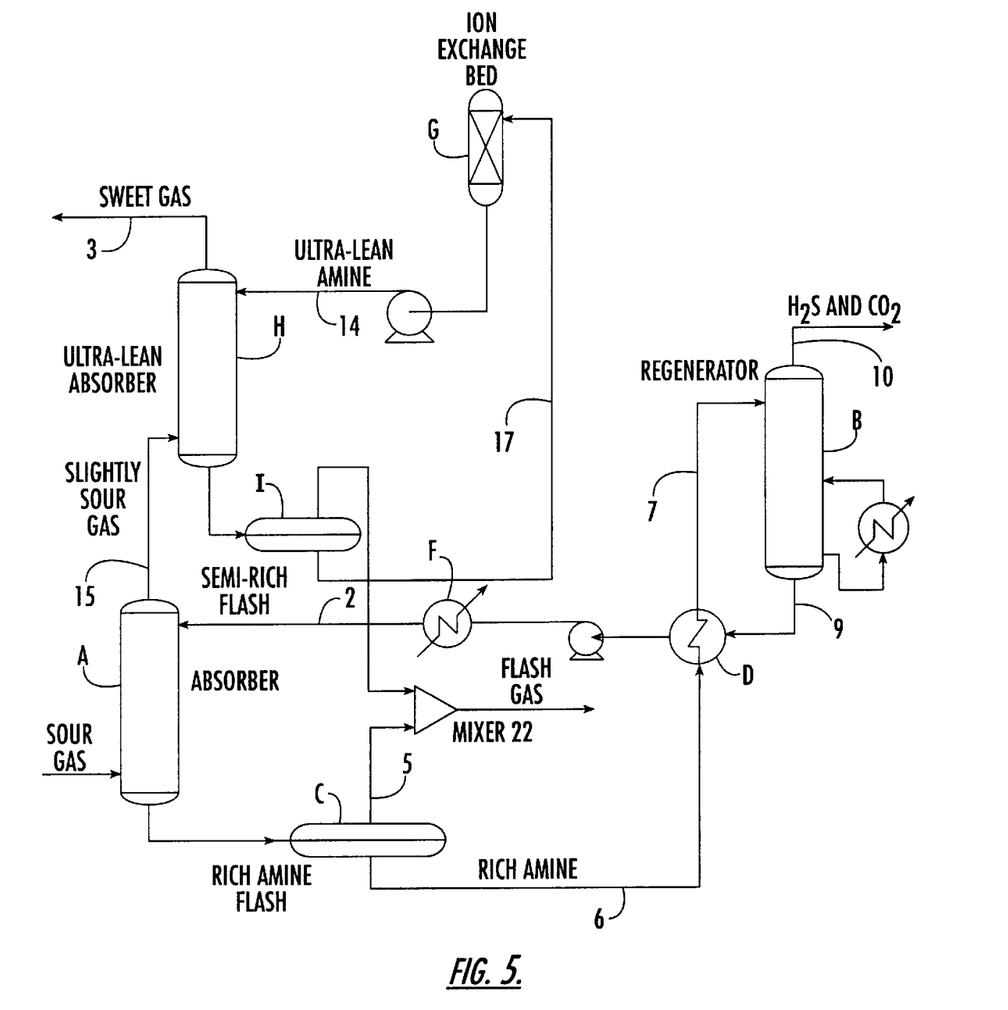
FIG. 5 is a schematic flow diagram showing a separate absorber for final gas cleanup with ultra-lean amine solution with a flow loop directly converting the used ultra-lean amine back to regenerated ultra-lean amine.

In the embodiment of the invention shown in FIG. 5 there is provided a process for treating sour process gas or liquid to remove acid gas compound that is similar to that shown in FIG. 2. The embodiment of the process shown in FIG. 5 differs from the process shown in FIG. 2 in that a completely separate down stream ultra-lean absorber H is provided for treatment of the product stream (line 15) from the first stage absorber A with ultra-lean amine solution 14. In this configuration the amine leaving the bottom of the ultra-lean absorber H is not commingled with the lean amine solution feed 2 to the top of the first stage absorber A. This permits recycle of the amine from the semi-rich tank I directly back to (via line 17) the ion exchange bed G for removal of absorbed acid gases and then returned to the top of the ultra-lean absorber H for another cycle of product treating. The flash gases from rich amine flash tank C and the flash gases from semi-rich amine flash tank I are combined in flash gas mixer 22. In some applications the amount of acid gas contained in the amine from the semi-rich flash tank I is lower than the residual acid gas content of the lean amine solution available from the regenerator B. The significance is that it would not put as great an acid gas removal load on the ion exchange resin bed, thus reducing the capital and operating cost of generating the ultra-lean amine by ion exchange.

Figure 6:
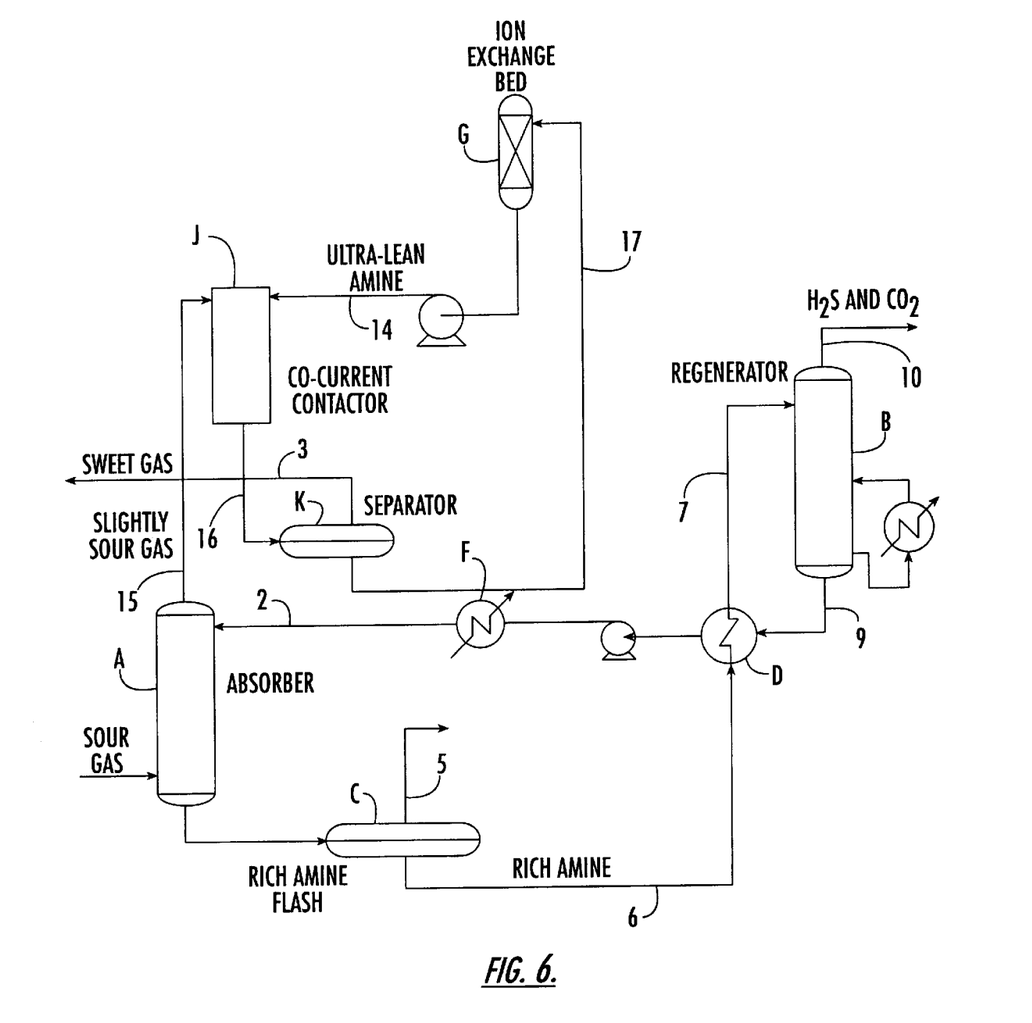
FIG. 6 is a schematic flow diagram showing treatment of the product stream from the absorber with ultra-lean amine in a co-current contactor.

In the embodiment shown in FIG. 6, which is also similar to the embodiment of FIG. 2 in many respects except where discussed below, there is provided a co-current contactor J down stream from the first stage absorber A feeding both the partially treated stream (line 15) from the first stage absorber A and the ultra-lean amine solution (line 14) at the inlets to effect a co-current contact in the flow of the two streams. The mixed stream of product and amine are sent via line 16 to a separator K for phase separation. The treated product (sweet gas) is recovered (line 3) and the amine solution is recycled to the ion exchange bed G for regeneration and return to the co-current contactor J. This embodiment provides the advantage of the short contact times experienced in co-current contactors to reduce the amount of $CO_2$ absorbed as a result of its lower rate of reaction with amine as compared to $H_2S$. In some applications and solvent compositions this results in an even lower amount of acid gas pickup by the ultra-lean amine while still reducing the $H_2S$ content of the product to the purity level needed.

As noted, the ultra-lean amine may be made by passing a stream of lean amine through an ion exchanger. The ion exchange removes acid gas from the lean amine solution by trading other anions on the resin for the acid gas anions (e.g., $HS^-$, $S^=$, $HCO_3^-$, $CO_3^=$) in the amine solution. The most advantageous anion to trade is hydroxide (OH), because it will react with any bound amine cation to form free amine and water, both of which are needed in the amine solution for acid gas absorption. Other anions could be used, but would result in an undesired buildup of heat stable salts in the amine solution. To accomplish the ion exchange, the amine solution is caused to contact the resin such that the desired ion exchange takes place. The treated amine solution is then available to be fed back to the contactors designated to take advantage of the ultra-lean amine. The spent resin is regenerated with the anion of choice, while the acid gas anions are flushed to waste as salts of the regenerant cation.

The most common general ion exchange processes are slurry, batch, continuous loop, and continuous rotating bed. Each can be used to produce the same ultra-lean amine. Also, each lends itself to particular exploitation for the present invention. A slurry of ion exchange resin in amine works, but is not as efficient as the other approaches. Batch processing provides batches of ultra-lean amine with the disadvantage of being separated in time. With batch processing, the ultra-lean amine would be best accumulated in a storage tank and drawn as needed as a supplemental feed to the designated contactor at a continuous rate capable of reducing the acid gas content of the contactor overhead process stream to required levels. Lean amine flow to the ion exchange beds in batch processing is interrupted for resin regeneration and rinsing steps. The continuous loop (continuous counter-current ion exchange), such as introduced by Higgins (Perry's Chemical Engineers Handbook, 4th Ed., pp. 19–23 to 19–26), provides a continuous flow of consistent ultra-lean amine. Continuous rotating bed systems offer a continuous flow of ultra-lean amine, or, can be configured to provide continuous flows of ultra-lean amine solution, regular lean amine solutions and mixtures of the two, depending on from which ports product is taken.

Anion exchange resins are known to remove the anions referred to here as acid gas anions from water. For example, see U.S. Pat. No. 4,970,344. The ability of ion exchange treating to completely remove acid gas from amine solutions has been demonstrated. Skillful and creative use of batch, continuous loop, or continuous rotating bed, or slurry processes can provide a plant with a wide range of capabilities to lower the residual acid gas concentration in portions or all of the amine solution.

The concentration of acid gas that escapes the contactor in the product stream is dependent on known thermodynamic, kinetic and engineering principles. Given a particular physical arrangement and process parameters, the residual acid gas loadings of $H_2S$ and $CO_2$ in the lean amine entering the contactor are the deciding factors in being able to meet specified maximum acid gas concentration in the exiting product stream. The lower the acid gas concentrations in the incoming amine, the lower the concentrations of acid gases exiting in the product stream 3. Calculations and field experience bear this out.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process for treating a sour process gas or liquid to remove acid gas compounds comprising:

providing a sour process gas or liquid comprising acid gas compounds;

contacting said sour process gas or liquid with a lean amine treating solution in an absorber, the lean amine treating solution having a first concentration of residual acid gas compounds, to reduce the concentration of acid gas compounds in the sour process gas or liquid by absorption into the lean amine treating solution; and then further contacting said process gas or liquid having reduced concentration of acid gas compounds with an ultra-lean amine treating solution, the ultra-lean amine treating solution having a second concentration of residual acid gas compounds lower than the first concentration, to effect further reduction in the concentration of acid gas compounds in the sour process gas or liquid, wherein said lean amine solution enters a counter-current absorber to contact said sour process gas or liquid at a point below the entry point for the ultra-lean amine.

2. The process according to claim 1 further comprising regenerating said lean amine treating solution and said ultra-lean amine treating solution after contact with said sour process gas or liquid for removal of the absorbed acid gas compounds to form a stream of lean amine treating solution.

3. The process according to claim 1 further comprising converting a portion of said lean amine solution to an ultra-lean amine solution by using a process selected from the group consisting of ion exchange, reverse osmosis, semi-permeable membranes, electrophoresis, surface adsorption and distillation.

4. The process according to claim 1 further comprising converting a portion of said lean amine solution to an ultra-lean amine solution by passing said lean amine solution through an ion exchange resin.

5. The process according to claim 1 wherein at least one of said lean amine treating solution and said ultra-lean amine treating solution is selected from the group consisting of monoethanolamine, diethanolamine, triethanolamine, methyldiethanolamine, diisopropanolamine, 2-(2-aminoethoxy) ethanol, methylmonoethanolamine, dimethylmonoethanolamine, aminomethylpropanol, hindered amines, and mixtures thereof.

6. The process according to claim 5 wherein at least one of said lean amine treating solution and said ultra-lean amine treating solution is a mixture including a physical solvent selected from the group consisting of sulfolane, N-methyl-2-pyrrolidone, dialkylethers of polyalkylene glycols, methanol and mixtures thereof.

7. The process according to claim 6 wherein said solvent comprises a dimethylether of polyethylene glycol.

8. The process according to claim 1 wherein said step of contacting said process gas or liquid with an ultra-lean amine treating solution comprises contacting said process gas or liquid with an ultra-lean amine treating solution in a separate absorber.

9. The process according to claim 8 further comprising collecting an acid gas compound-enriched ultra-lean amine solution from said separate absorber; and converting the enriched ultra-lean amine solution to an ultra-lean amine treating solution by reduction of acid gas compounds in the enriched ultra-lean solution.

10. The process according to claim 9 wherein said converting step comprises a process selected from the group consisting of ion exchange, reverse osmosis, semi-permeable membranes, electrophoresis, surface adsorption and distillation.

11. The process according to claim 1 wherein said step of contacting said process gas or liquid with an ultra-lean amine treating solution comprises contacting said process gas or liquid with an ultra-lean amine treating solution in a co-current contactor.

12. The process according to claim 11 further comprising collecting an acid gas compound-enriched ultra-lean amine solution from said co-current contactor; and converting the enriched ultra-lean amine solution to an ultra-lean lean amine treating solution by reduction of acid gas compounds in the enriched ultra-lean solution.

13. The process according to claim 12 wherein said converting step comprises a process selected from the group consisting of ion exchange, reverse osmosis, semi-permeable membranes, electrophoresis, surface adsorption and distillation.

14. The process according to claim 1 wherein said ultra-lean amine solution comprises less than about 0.0001 total moles of acid gas per mole of amine.

15. A process for treating a process gas or liquid to remove absorbed acid gases comprising:

contacting said process gas or liquid stream with a first stream having a lean amine treating solution to partially absorb said acid gases, said lean amine treating solution having a first concentration of residual acid gas compounds and being selected from the group consisting of monoethanolamine, diethanolamine, triethanolamine, methyldiethanolamine, diisopropanolamine, 2-(2-aminoethoxy) ethanol, methylmonoethanolamine, dimethylmonoethanolamine, aminomethylpropanol, hindered amines, and mixtures thereof;

thereafter contacting said partially absorbed gas or liquid stream with a second stream having an ultra-lean amine treating solution, said ultra-lean amine treating solution having a second concentration of residual acid gas compounds lower than the first concentration, to effect further removal of said acid gases;

recovering a product gas or liquid reduced in content of one or more acid gases; and regenerating said lean amine treating solution and said ultra-lean amine treating solution to recover the acid gases and form a stream of lean amine treating solution.

16. The process according to claim 15 further comprising converting at least a portion of said lean amine solution to an ultra-lean amine solution by using a process selected from the group consisting of ion exchange, reverse osmosis, semi-permeable membranes, electrophoresis, surface adsorption and distillation.

17. A process for treatment of a lean treating solution having absorbed acid gases therein comprising:

providing a lean treating solution having a first concentration of residual acid gas compounds;

reducing the amount of said acid gas compounds in at least a portion of said lean treating solution such that said portion of said lean treating solution becomes an ultra-lean treating solution, said ultra-lean treating solution having a second concentration of residual acid gas compounds lower than said first concentration; and utilizing said ultra-lean treating solution to reduce the acid gas content of a process gas or liquid stream by contacting a process gas or liquid that has been treated with a lean treating solution with said ultra-lean treating solution.

18. The process according to claim 17 wherein said lean treating solution is an aqueous solution of an amine, a mixture of amines or their combination with a physical solvent to produce a hybrid solvent.

19. The process according to claim 18 wherein said lean treating solution is an aqueous solution of an amine, a mixture of amines selected from the group consisting of monoethanolamine, diethanolamine, triethanolamine, methyldiethanolamine, diisopropanolamine, 2-(2-aminoethoxy) ethanol, methylmonoethanolamine, dimethylmonoethanolamine, aminomethylpropanol, hindered amines, and mixtures thereof, or their combination with a physical solvent selected from the group consisting of sulfolane, N-methyl-2-pyrrolidone, dialkylethers of polyalkylene glycols and methanol.

20. The process according to claim 18 wherein said reducing step comprises passing said lean amine treating solution through an ion exchange resin.

21. The process according to claim 17 wherein said reducing step comprises a process selected from the group consisting of ion exchange, reverse osmosis, semi-permeable membranes, electrophoresis, surface adsorption and distillation.

* * * * *